(12) United States Patent
Van Beek

(10) Patent No.: US 12,257,797 B2
(45) Date of Patent: Mar. 25, 2025

(54) CUTTING DEVICE AND METHOD FOR CUTTING A STRIP AND PRODUCTION LINE FOR APPLYING AN APEX TO A BEAD

(71) Applicant: VMI Holland B.V., Epe (NL)

(72) Inventor: Willem Marinus Van Beek, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 18/699,886

(22) PCT Filed: Oct. 31, 2022

(86) PCT No.: PCT/NL2022/050612
§ 371 (c)(1),
(2) Date: Apr. 9, 2024

(87) PCT Pub. No.: WO2023/091000
PCT Pub. Date: May 25, 2023

(65) Prior Publication Data
US 2025/0010562 A1    Jan. 9, 2025

(30) Foreign Application Priority Data

Nov. 17, 2021   (NL) ...................................... 2029796

(51) Int. Cl.
*B29D 30/46*    (2006.01)
*B29D 30/32*    (2006.01)
*B29D 30/48*    (2006.01)

(52) U.S. Cl.
CPC ............ *B29D 30/46* (2013.01); *B29D 30/32* (2013.01); *B29D 30/48* (2013.01); *B29D 2030/463* (2013.01)

(58) Field of Classification Search
None
See application file for complete search history.

(56) References Cited

U.S. PATENT DOCUMENTS

2008/0073020 A1    3/2008   Lammlein .................. 156/110.1

FOREIGN PATENT DOCUMENTS

| EP | 1902819 | 3/2008 | ............ B26D 1/00 |
| JP | H04113831 | 4/1992 | ............ B29D 30/30 |
| JP | 2014159105 | 9/2014 | ............ B29D 30/30 |
| JP | 2016503734 | 2/2016 | ............ B29D 30/48 |
| WO | 2014092558 | 6/2014 | ............ B29D 30/48 |
| WO | 2019172749 | 9/2019 | ............ B29C 31/00 |

OTHER PUBLICATIONS

Search Report issued in Netherlands Patent Appln. Serial No. 2029796, dated Jul. 14, 2022, 8 pages.
(Continued)

*Primary Examiner* — Jacob T Minskey
*Assistant Examiner* — Adrien J Bernard
(74) *Attorney, Agent, or Firm* — HAYES SOLOWAY P.C.

(57) ABSTRACT

Disclosed is a cutting device for cutting a continuous length of a strip, in particular an apex for tire building, wherein the cutting device has a conveyor for conveying the strip in a transport direction in a support plane and a knife for cutting through the strip along a cutting line transverse to the transport direction. The cutting device further includes a positioning device for pushing the strip in a positioning direction up to a longitudinal reference line at or near the cutting line.

29 Claims, 7 Drawing Sheets

(56) References Cited

OTHER PUBLICATIONS

International Search Report and Written Opinion issued in PCT/NL2022/050612, dated Feb. 2, 2023, 8 pages.
Decision to Grant issued in related Japanese Application Serial No. 2023-517278, dated Sep. 3, 2024, with translation, 5 pages.
Notice of Refusal issued in Japan Patent Appln. Serial No. 2023-517278, dated Apr. 23, 2024, with machine translation, 14 pages.

CUTTING DEVICE AND METHOD FOR CUTTING A STRIP AND PRODUCTION LINE FOR APPLYING AN APEX TO A BEAD

BACKGROUND

The invention relates to a cutting device and a method for cutting an strip, in particular an apex or apex filler for tire building. The invention further relates to a production line for applying an apex to a bead.

WO 2014/092558 A1 discloses a tire building machine for applying an apex to a bead to form a bead-apex assembly for a green tire, comprising a bead holder for holding the bead, wherein the tire building machine comprises a first gripper and a second gripper for engaging and moving the apex in a direction of conveyance towards the bead, wherein the first gripper is moveable between a first start position and a first end position and the second gripper is moveable between a second start position and a second end position, wherein the tire building machine is provided with wedges, wherein the grippers are biased to a closed state in which the grippers are arranged to engage the apex, and wherein the wedges are arranged for countering the bias of the grippers when the grippers are at one of the start positions or the end positions.

The tire building machine further comprises a cutting device having a cutting knife which is placed above the plane of conveyance and an anvil which is placed just underneath the plane of conveyance. The anvil comprises a cutting surface and two clamping surfaces. The cutting knife of the cutting device can be moved onto the cutting surface of the anvil for cutting the length of apex into an apex strip having a leading end and a trailing end. The tire building machine is provided with two clamping blocks which are arranged for moving towards the clamping surfaces. The clamping blocks can be lifted upwards to move out of the way of the grippers. In between the cutting surface and the clamping surfaces, the anvil is provided with recesses for receiving the grippers.

SUMMARY OF THE INVENTION

A disadvantage of the known cutting device is that the apex strip tends to meander and/or warp when being transported at high speeds. Consequently, the lateral position and/or the orientation of the apex strip may vary at the location of the cutting knife. Hence, when the apex strip has been cut, the width and/or the lateral position of the leading and trailing ends of a cut to length apex strip may deviate. Said leading and trailing ends are transported linearly by the respective grippers and are subsequently spliced on the building drum. As is shown in FIG. 14, the deviations in the lateral positions of the leading end LE and the trailing end TE may cause an inferior splice having so called 'dog ears' 95. Moreover, air inclusions or air pockets may be formed between the apex strip and the bead at the base of the apex strip as a result of the shifted lateral positions. Said inferior splice can negatively influence the quality of the resulting tire.

It is an object of the present invention to provide a cutting device for cutting a strip, in particular an apex for tire building, in which the strip can be cut and/or spliced more accurately.

According to a first aspect, the invention relates to a cutting device for cutting a continuous length of a strip, in particular an apex for tire building, wherein the cutting device comprises a conveyor for conveying the strip in a transport direction in a support plane and a knife for cutting through the strip along a cutting line transverse to the transport direction, wherein the cutting device further comprises a positioning device for pushing the strip in a positioning direction transverse or perpendicular to the transport direction towards a longitudinal reference line at the cutting line.

The positioning device can position a lateral side of the strip at or near the reference line at the cutting line. Hence, the lateral position of the strip at the cutting line is substantially the same for each cut. Accordingly, the lateral alignment of the resulting leading and trailing ends is substantially the same for each cut as well. Hence, said leading end and trailing end can be gripped more accurately and/or reliably. Consequently, said leading and trailing ends can be positioned and/or spliced more accurately on a subsequent drum. Hence, the leading and trailing ends can be spliced more reliably. Thus, dog ears and/or air inclusions can be reduced or ultimately prevented.

In an embodiment thereof, the positioning device comprises one or more positioning elements which are movable relative to the conveyor in the positioning direction for pushing a first lateral side of the strip towards the longitudinal reference line. The one or more positioning elements can conveniently displace the strip relative to the conveyor by pushing a lateral side of said strip.

In an embodiment thereof, the positioning device is arranged to push one of the one or more positioning elements against the strip at the cutting line. Hence, the first lateral side of the strip can be positioned with respect to the reference line at the cutting line more accurately. Accordingly, the location of the incision of the knife at said first lateral side of the strip can be determined more accurately. Moreover, the location of the trailing and leading ends with respect to the respective grippers can be determined more accurately.

In an alternative embodiment, the positioning device is arranged to push one of the one or more positioning elements against the strip downstream or upstream of the cutting line in the transport direction. In other words, the positioning element does not intersect with the cutting line. Hence, the strip can be cut without the need of removing the positioning element. Hence, the cutting process can be more efficient.

In a further embodiment, the positioning device comprises two or more positioning elements, wherein the positioning device is arranged to push a first positioning element of the one or more positioning elements against the strip downstream of the cutting line in the transport direction, and wherein the positioning device is arranged to push a second positioning element of the one or more positioning elements against the strip upstream of the cutting line in the transport direction. The two positioning elements can align the first lateral side of the strip with respect to the reference line on both sides of the cutting line. Hence, the first lateral side can be aligned more accurately at the cutting line. Additionally, the positioning element does not intersect with the cutting line. Hence, the strip can be cut without the need of removing the positioning element. Hence, the cutting process can be more efficient.

In a further embodiment the positioning device further comprises a drive member for pushing the first positioning element and the second positioning element in the positioning direction into contact with the strip, wherein the first positioning element and the second positioning element are arranged to move in a first displacement direction and a second displacement direction opposite to the first displacement direction relative to the drive member. The positions of the positioning elements can thus be adjusted in accordance with an angular offset of the lateral side of the strip with respect to the reference about a (virtual) point between the two positioning elements.

Preferably, the movement of the first positioning element in the first displacement direction has a specific relationship, for example a fixed relationship or a 1:1 relationship or in a directly proportional relationship to the distance of said positioning elements to the cutting line or a middle line between the positioning elements, with the movement of the second positioning element in the second displacement direction.

In an embodiment thereof, the first positioning element and the second positioning element are pivotable about a common pivot axis extending transverse or perpendicular to the support plane. Preferably, the first positioning element and the second positioning element are arranged at a fixed mutual angle about the pivot axis. Hence, the first lateral side of the strip can be positioned more accurately with respect to the intersection of the cutting line and the reference line, even when the strip locally extends at a small oblique angle with respect to said reference line.

In a further embodiment, the positioning device comprises a bracket which is rotatable about the pivot axis and which supports the first positioning element and the second positioning element. The bracket can hold the positioning elements in a relative position with respect to the strip, the reference line and/or the cutting line.

Preferably, the first positioning element and the second positioning element are in a fixed position relative to said bracket. The bracket can fix the relative position of the positioning elements relative to each other, such that they can be rotated about the pivot axis as one. In other words, the positioning elements can remain in the same relative position with respect to each other while pivoting.

Additionally or alternatively, the bracket comprises one or more first bracket members extending above or below the support plane up to the pivot axis and one or more second bracket members extending in the support plane to carry the first positioning element and the second positioning element, wherein the pivot axis is located at an intersection between the cutting line and the reference line. Consequently, the one or more first bracket members extending above or underneath the support plane can stay clear of the knife, the anvil or other parts of the cutting device, while they can be connected to or reach up to a pivot axis that can be located closer, as close as possible or at the intersection, without hindering the operation of the knife.

In another embodiment the pivot axis is a virtual pivot axis. For example, a mechanism may be chosen that does not have a physical connection or physical hinge at the pivot axis position. Hence, the pivot position can be chosen as close as possible to or at the reference line, without hindering the operation of the knife.

In a further preferred embodiment, the first positioning element and the second positioning element are arranged symmetrical with respect to a middle line intersecting with and extending radially with respect to the pivot axis.

In a further embodiment, the pivot axis intersects with the cutting line.

In a further embodiment, the one or more positioning elements are rollers which are each rotatable about a roller axis transverse or perpendicular to the support plane. The rollers can abut the first lateral side of the strip in any orientation. The rollers can rotate slightly when the position and/or orientation of the bracket with respect to the strip is changed about the aforementioned pivot axis and the relative position of the rollers along the lateral side of the strip changes slightly. Hence, any forces generated on the strip as a result of the change in position and/or orientation of the bracket can be reduced.

In a further embodiment, the positioning device comprises a positioning drive for pushing the one or more positioning elements in the positioning direction. Preferably, the one or more positioning elements are attached to a drive member which is movable in the positioning direction with respect to a base by actuating the drive.

In an embodiment thereof, the positioning drive is a linear drive. Hence, the drive can push the one or more positioning elements linearly in the positioning direction. Said linear drive may for example be a pneumatic drive.

In a further embodiment thereof, the positioning drive has a fixed stroke. Preferably, the stroke is physically limited. In other words, the displacement of the one or more positioning elements, or in the case of the pivotable elements, the displacement of the pivot axis, is always the same. Hence, the positioning device can push the strip towards or ultimately up to the reference line without the need of a feedback system. Hence, the positioning device can be kept simple.

In a further embodiment, the cutting device comprises an anvil for cooperating with the knife, wherein the anvil is located below the support plane. Preferably, the anvil comprises one or more recesses for accommodating the one or more positioning elements, at least when said one or more positioning elements are being displaced in the positioning direction towards the longitudinal reference line. Hence, the one or more positioning elements can extend below the support surface. Accordingly, the positioning elements can push the strip over the entire height thereof, without causing a sliding friction between said positioning element and the anvil at the support plane.

In a further embodiment, the cutting device further comprises clamping elements for clamping the strip upstream and downstream of the cutting line in the transport direction. Said clamping elements can clamp the strip after the lateral side thereof has been positioned at or near the reference line. Hence, the strip can be cut while being clamped. The clamping can prevent displacements of the strips due to forces exerted on the strip by the cutting device. Because the strip can positioned at or near the reference line before the clamping, the clamping elements can clamp the strip more accurately. Hence, after the strip is cut, the resulting leading end and trailing end can be determined more accurately and/or reliably.

According to a second aspect, the invention relates to a production line for applying an apex strip to a bead, wherein the production line comprises the cutting device according to present invention and a drum for holding the bead, wherein the production line further comprises grippers for gripping the leading a leading end and a trailing end of a cut to length apex strip at the cutting device and for depositing said leading end and said trailing end at the drum. The production line comprises the cutting device according to the present invention, hence, the same advantages as discussed above apply. Moreover, the grippers can more accurately grip the leading and trailing ends. Hence, the apex strip can be deposited on the drum more accurately. Thus, 'dog ears' at the splice between said leading and trailing ends and/or air pockets between the apex and the bead can be reduced or ultimately prevented. Hence, said apex strip can be spliced more reliably.

According to a third aspect, the invention relates to a method for cutting a strip, wherein the method comprises the steps of:
a) transporting the strip in a transport direction in a support plane;
b) cutting the strip cutting line along a transverse or perpendicular to the transport direction; and
c) before step b), pushing a first lateral side of the strip in a positioning direction transverse or perpendicular to the transport direction up to a longitudinal reference line.

By aligning the lateral side of the strip before cutting, the location of the cut at said lateral side can be determined more accurately. Hence, the strip can be cut more precisely. Moreover, the resulting leading and trailing ends of the cut to length strip can be determined more accurately. Hence, said leading and trailing ends can be gripped more accurately. Accordingly, said leading and trailing ends can be positioned more accurately for splicing. Hence, a better splice can be obtained.

In an embodiment thereof, the strip is clamped during step b). Hence, a displacement of the strip due to the cutting can be prevented.

In a further embodiment thereof, step c) comprises pushing the first lateral side of the strip at two distinct points, wherein a first one of the distinct points is located downstream of the cutting line in the transport direction, and wherein a second one of the distinct points is located upstream of the cutting line in the transport direction.

In a further embodiment, the method comprises using the cutting device according to the present invention. Hence, the method incorporates the advantages of the cutting device as discussed above.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
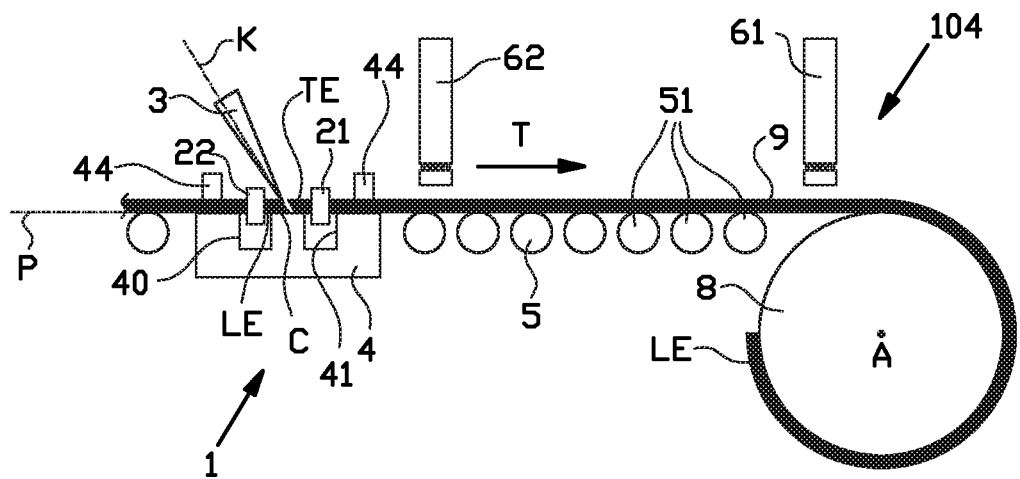
FIG. 1 shows a side view of an production line for a strip, comprising the cutting device according to the present invention.

FIG. 1 shows a production line 100 for producing an strip 9, in particular an apex or apex filler for tire building. The strip 9 is preferably made from an elastomeric or rubber material. The production line 100 comprises a cutting device 1 according to the present invention for cutting a continuous length of the strip 9 to length. The production line 100 further comprises a drum 8 which is rotatable about a drum axis A for winding the cut to length strip 9 around a bead core (not shown). Preferably, the production line 100 further comprises grippers (not shown) for picking up the leading end LE and the trailing end TE of the cut to length strip 9, and for depositing said leading end LE and said trailing end TE at the drum 8. Said grippers are known per se and are for example disclosed in WO 2014/092558 A1.

Figure 6:
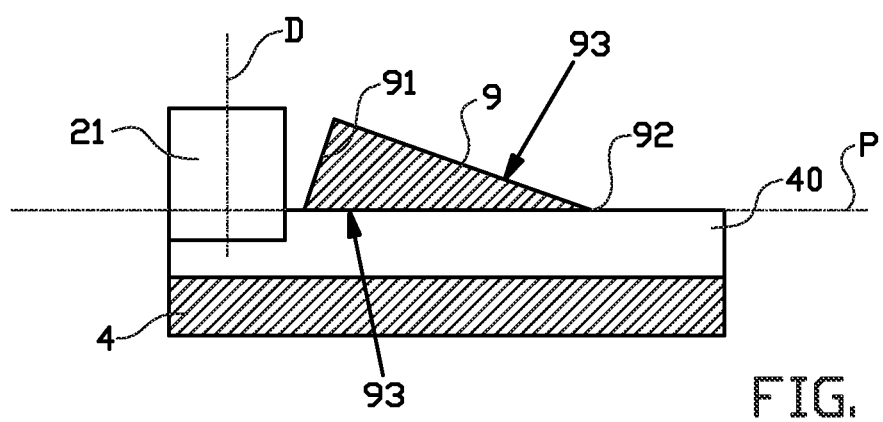
FIG. 6 shows a section view according to the line VI-VI in FIG. 4.

As is shown in FIG. 6, an strip 9 in the form of an apex, or apex filler is triangular or substantially triangular in cross-section. The apex extends between a short side or first lateral side 91 and a tip or second lateral side 92. The apex further comprises two opposing long sides 93 between the first lateral side 91 and the second lateral side 91. Preferably, the apex is transported on one of the long sides 93 to prevent sagging or deformation of the tip at the second lateral side 92.

Figure 2:
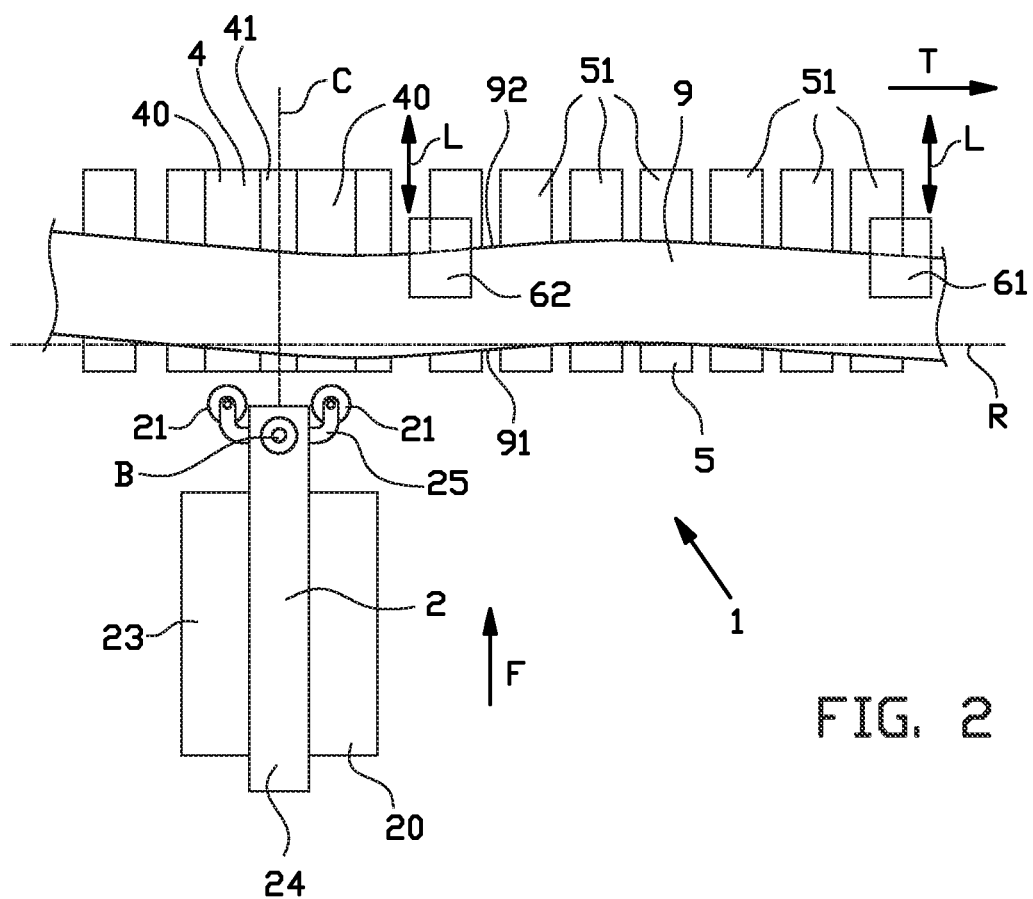
FIGS. 2 and 3 show a top view of the cutting device according to FIG. 1, comprising a positioning device for positioning the strip.
Figure 3:
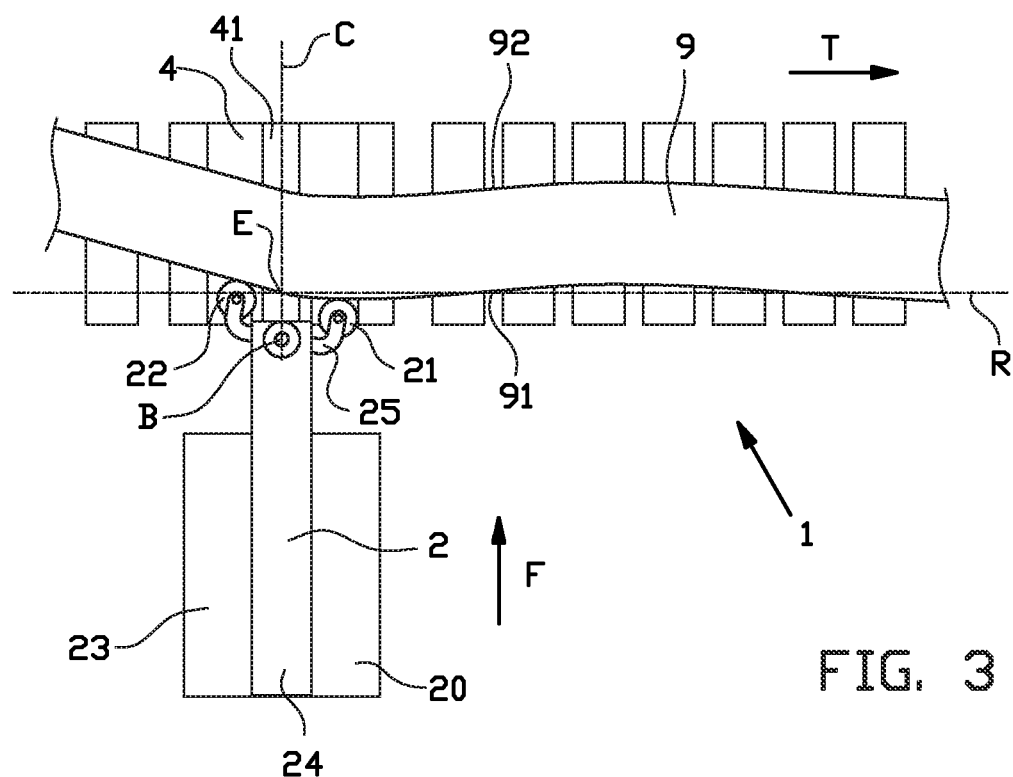

As is shown in FIGS. 1-3, the cutting device 1 comprises a conveyor 5 for supporting the strip 9 in a support plane P. The conveyor 5 is further arranged for conveying the strip 9 in a transport direction T in said support plane P. Preferably, the conveyor 5 is a roller conveyor comprising a plurality of conveyor rolls 51.

The cutting device 1 further comprises a knife 3 for cutting through the strip 9 along a cutting line C transverse or perpendicular to the transport direction T. The term 'transverse' is to be understood as 'across' but not necessarily perpendicular, i.e. at an oblique angle, for example within ten or twenty degrees from the perpendicular direction. The cutting line C corresponds to an intersection line between a cutting plane (not shown) and the support plane P. In this particular embodiment, the knife 3 comprises a cutting blade 31 that extends at an angle with respect to the support plane P when regarded in the transport direction T. In this particular embodiment, the knife 3 is a guillotine type knife, i.e., the cutting blade 31 is movable in a cutting direction K transverse or perpendicular to the support plane P. Alternatively, the cutting blade 31 may arranged for cutting transversely through the strip in a cutting direction along or substantially along the cutting line C.

As is shown in FIGS. 1-3, the cutting device 1 further comprises an anvil 4 for cooperating with the knife 3. The anvil 4 is located below the support plane P. In other words, the anvil 4 is located opposite to the knife 3 with respect to the support plane P. The anvil comprises a cutting surface 41 extending in the support plane P at the location of the cutting line C for receiving the blade 31 of the knife 3.

As is shown in FIG. 1, the cutting device 1 comprises two clamping elements 44 for clamping retaining the strip 9 on opposite sides of the cutting line C. Preferably, the strip 9 is when the knife 3 cuts through said strip 9 at the cutting line C. The clamping elements 44 are arranged to retain the strip 9 with respect to the anvil 4. In particular, the clamping elements 44 are arranged to press the strip 9 on the anvil 4 in a pressing direction transverse or perpendicular to the support plane P or to clamp the strip 9 in the support plane P in cooperation with said anvil 4 or other suitable support members associated with the conveyor 5 and/or the clamping elements 44.

In this particular embodiment, the cutting device 1 comprises one clamping element 44 downstream of the cutting line C in the transport direction T for clamping a trailing end TE of the cut to length strip 9 downstream of the cutting line C. The cutting device further comprises a clamping element 44 upstream of the cutting line C in the transport direction T for clamping a leading end LE of the continuous length of the strip 9.

As is further shown in FIGS. 1-3, the anvil 4 comprises two recesses 40. Said recesses 40 are open to the support plane P. A first one of the recesses 40 is arranged downstream of the cutting line C in the transport direction T. Said recess 40 is arranged to receive a trailing end gripper (not shown) for gripping the trailing end TE of the cut to length strip 9. The second one of the recesses 40 is arranged upstream of the cutting line C in the transport direction T. Said recess 40 is arranged to receive a leading end gripper 61 and/or the trailing end gripper 62 for gripping the leading end LE and/or the trailing end TE of continuous strip 9.

FIGS. 1 and 2 further show the leading end gripper 61 and the trailing end gripper 62 for the purpose of engaging the leading end LE and trailing end TE of the same or subsequent lengths of the strip 9 to the drum 8 to be applied to a bead.

Typically, the leading end gripper 61 is arranged to grip the leading end LE of the continuous strip 9 and deposit said leading end LE on the circumference of the drum 8. Preferably, said leading end LE is then retained on said drum 8 by another leading end gripper or winding gripper (not shown). Subsequently, the continuous strip 9 is cut to length, forming the trailing end TE of the respective strip 9. The trailing end gripper 62 is arranged for conveying said trailing end TE of the cut to length strip 9 towards the drum 8 while winding said strip 9 around the circumference of the drum 8.

Figure 14:
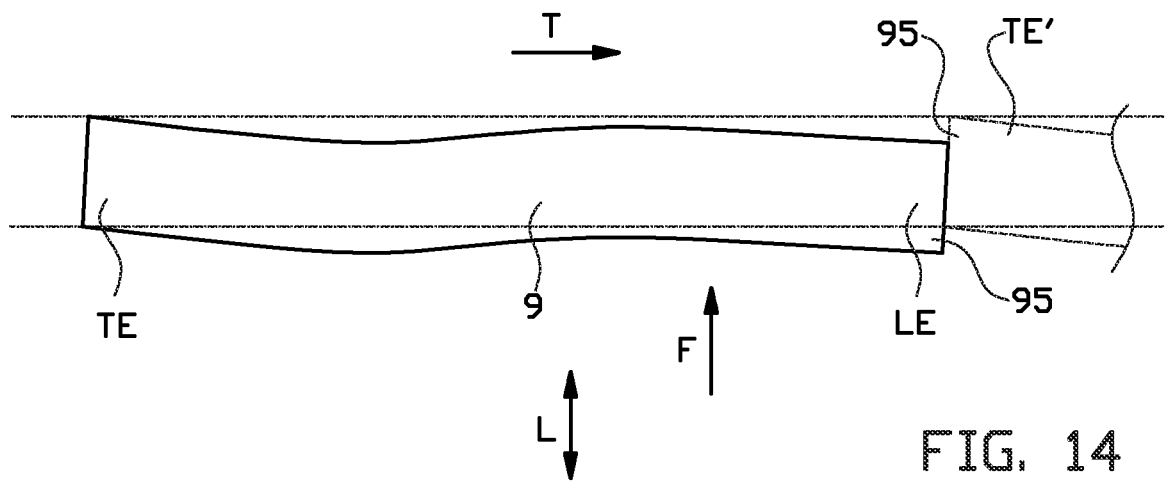
FIG. 14 shows the problem underlying the present invention.

The leading end gripper 61 and the trailing end gripper 62 are typically moved in a linear motion from the knife 3 towards the drum 8 in the transport direction T. However, when the strip 9 is observed to be meandering or warping causing the trailing end TE, projected as TE' next to the leading end LE in FIG. 14, to be shifted with regard to said leading end LE, the leading end gripper 61, the trailing end gripper 62 and/or any other gripper for gripping a leading end LE or a trailing end TE of the strip 9 may be additionally configured or controlled so as to be movable in a lateral direction L perpendicular to the transport direction T while holding, clamping or gripping the leading end LE and the trailing end TE, respectively, as shown in FIG. 2, to correct the lateral position of said leading end LE and said trailing end TE.

As is shown in FIGS. 2-5, the cutting device 1 further comprises a positioning device 2 for pushing the strip 9 in a positioning direction F transverse or perpendicular to the transport direction T towards a longitudinal reference line R at the cutting line L. In particular, the positioning device 2 is arranged for pushing the first lateral side 91 of the strip 9 towards the reference line R. Said reference line R extends parallel or substantially parallel to the transport direction T.

The positioning device 2 comprises a first positioning element 21 and a second positioning element 22 which are movable relative to the conveyor 5 in the positioning direction F for pushing the first lateral side 91 towards the reference line R. The first positioning element 21 is arranged downstream of the cutting line C in the transport direction T. The second positioning element 22 is arranged upstream of the cutting line C in the transport direction T.

The positioning device 2 comprises a base 20 and a drive member 24 which is movable with respect to said base 20. The positioning device 2 further comprises a bracket 25 for coupling the first positioning element 21 and the second positioning element 22 to the drive member 24. Preferably, said positioning elements 21, 22 are rollers which are each rotatable with respect to the bracket 25 about a roller axis D transverse or perpendicular to the support plane P.

The positioning device 2 further comprises a positioning drive 23 for driving the drive member 24 back and forth in the positioning direction F with respect to the base 20. Preferably, the positioning drive 23 is a linear drive, for example a pneumatic drive. The base 20 is fixed in position with respect to the conveyor 5.

Preferably, the positioning drive 23 has a fixed stroke. In other words, the positioning drive 23 may drive the drive member 24 to be displaced towards the reference line over a fixed interval.

The first positioning element 21 and the second positioning element 22 are pivotable about a common pivot axis B extending transverse or perpendicular to the support plane P. Preferably, the pivot axis B extends transverse or perpendicular to and/or intersects with the cutting line C. In particular, the bracket 25 is rotatable about the pivot axis B. Hence, the first and second positioning elements 21, 22 can adapt to an angular displacement of the strip 9 with respect to the reference line R.

The first positioning element 21 and the second positioning element 22 are arranged at a fixed mutual angle about the pivot axis B. Preferably, the first positioning element 21 and the second positioning element 22 are arranged symmetrical with respect to a middle line M intersecting with and extending radially with respect to the pivot axis B. In other words, the first positioning element 21 and the second positioning element 22 are arranged on a circular arc about the pivot axis B.

The drive member 24 is arranged for pushing the first positioning element 21 and the second positioning element 22 in the positioning direction F into contact with the strip 9. Because of the pivoting bracket 25, the first positioning element 21 and the second positioning element 22 are arranged to move together with said bracket 25 about the pivot axis B, thereby causing the first positioning element 21 and the second positioning element 22 to move in opposite displacement directions V relative to the drive member 24 pushing said bracket 25 in the positioning direction F. In particular, in this example, the first positioning element 21 is pushed backwards in a first displacement direction V parallel but opposite to the positioning direction F, while the second positioning element 22 is displaced in the other displacement direction W in the same direction as the positioning direction F.

In particular, the bracket 25 may act as a seesaw. In this example, the relationship between the movement of the first positioning element 21 in first displacement direction V and the movement of the second positioning element 22 in the opposite second displacement direction W is a fixed relationship, and in particular an inverse 1:1 relationship.

Alternatively, when the positioning elements 21, 22 are not positioned symmetrically to the middle line L, the relationship between the movements of the positioning elements 21, 22 in the respective displacement directions V, W may be chosen to be directly proportional to the relationship between the distance of the respective positioning elements 21, 22 to the cutting line C and/or the middle line L.

A method for cutting the strip 9 is now described using FIGS. 1-5.

As is shown in FIG. 1, a first strip 9 has been cut to length and has been partially wound around the drum 8.

Subsequently, as is shown in FIG. 2, the continuous strip 9 is conveyed in the transport direction T past the cutting line C.

When a predetermined length of the strip 9 has been conveyed past the cutting line C, the first and second positioning elements 21, 22 are driven in the positioning direction F by the positioning drive 23.

Figure 5:
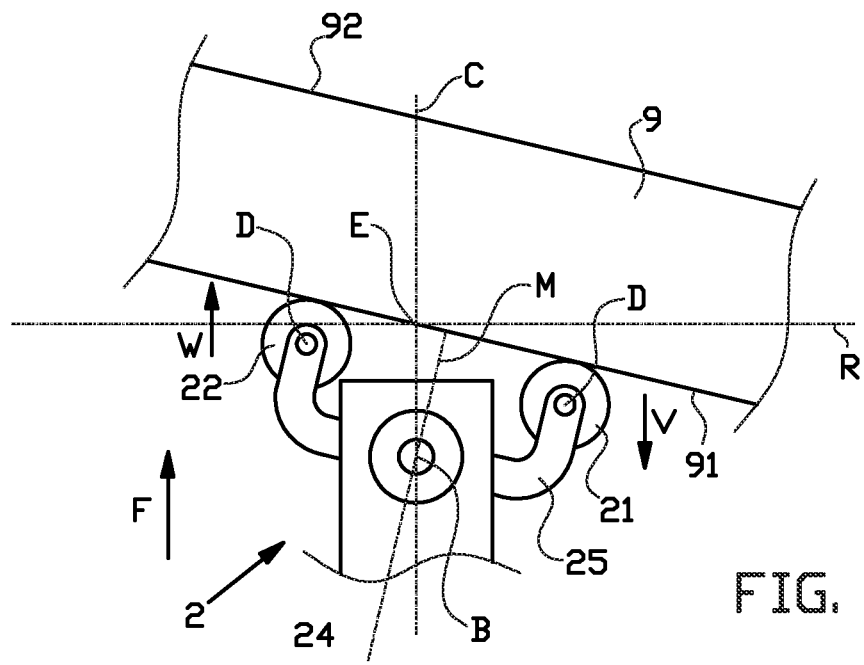

As is shown in FIGS. 3 and 5, the first positioning element 21 has contacted the first lateral side 91 of the strip 9, causing the bracket 25 to pivot about the pivot axis B. The second positioning element 22 has been urged further in the positioning direction F into contact with the first lateral side 91. Subsequently, the first and second positioning elements 21, 22 urge the strip 9 towards the reference line R.

As is shown in FIG. 1, the strip 9 is now clamped using the clamping elements 44 cooperating with the anvil 4 or having their own lower support members. Subsequently, the strip 9 is cut to length using the knife 3. The trailing end gripper (not shown) may now grip the resulting trailing end TE of the cut to length strip 9 and convey said trailing end towards the drum 8 while winding said strip 9 around the circumference of the drum 8. Subsequently or simultaneously, the leading end gripper (not shown) may now grip the leading end LE of the continuous strip 9 and convey said leading end LE in the transport direction T towards the drum 8.

Figure 7:
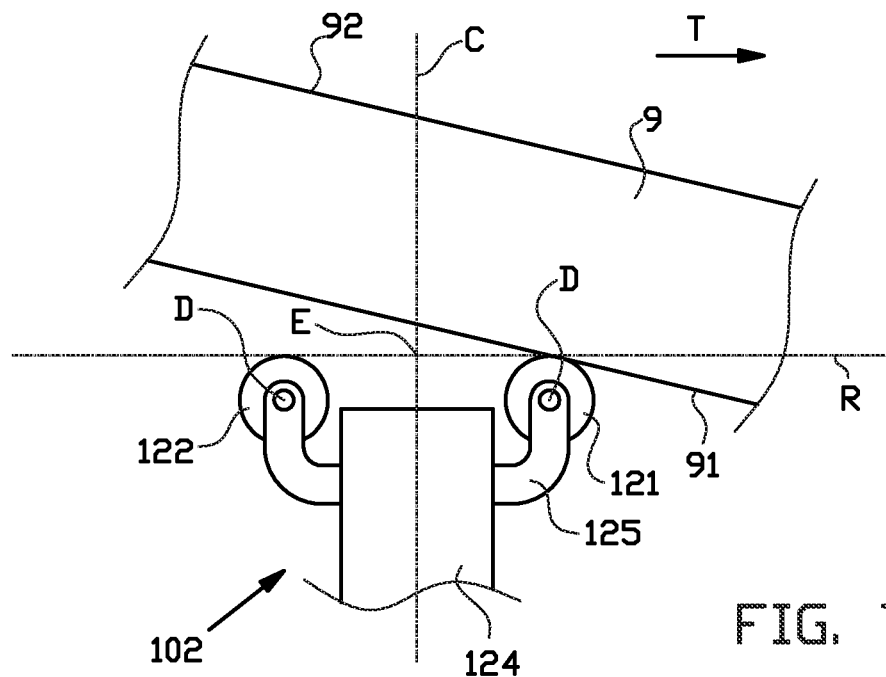
FIGS. 7-13 show alternative positioning devices.

FIG. 7 shows an alternative positioning device 102. The alternative positioning device 102 differs from the previously discussed positioning device 2 in that the positioning elements 121, 122 are not pivotable. In other words, the bracket 125 has been fixedly attached to the drive member 124. The positioning elements 121, 122 are positioned on both sides of the cutting line C. Hence, both clockwise and anticlockwise angular deviations of the first lateral edge 91 of the strip 9 with respect to the reference line R can be corrected. Since the positioning elements 121, 122 are fixed with respect to the cutting line C, interference between the positioning elements and the knife 3 may be prevented.

Figure 8:
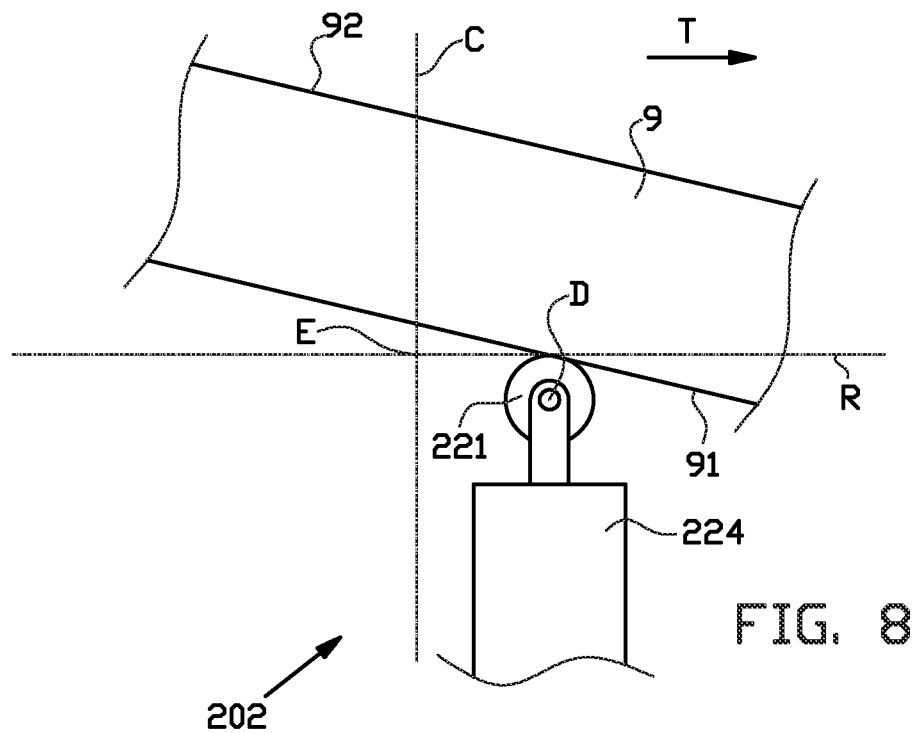

FIG. 8 shows a further alternative positioning device 202. Said positioning device 202 differs from the previously discussed position device 102 in that the positioning device 202 comprises only a single positioning element 221 downstream of the cutting line in the transport direction T.

Figure 9:
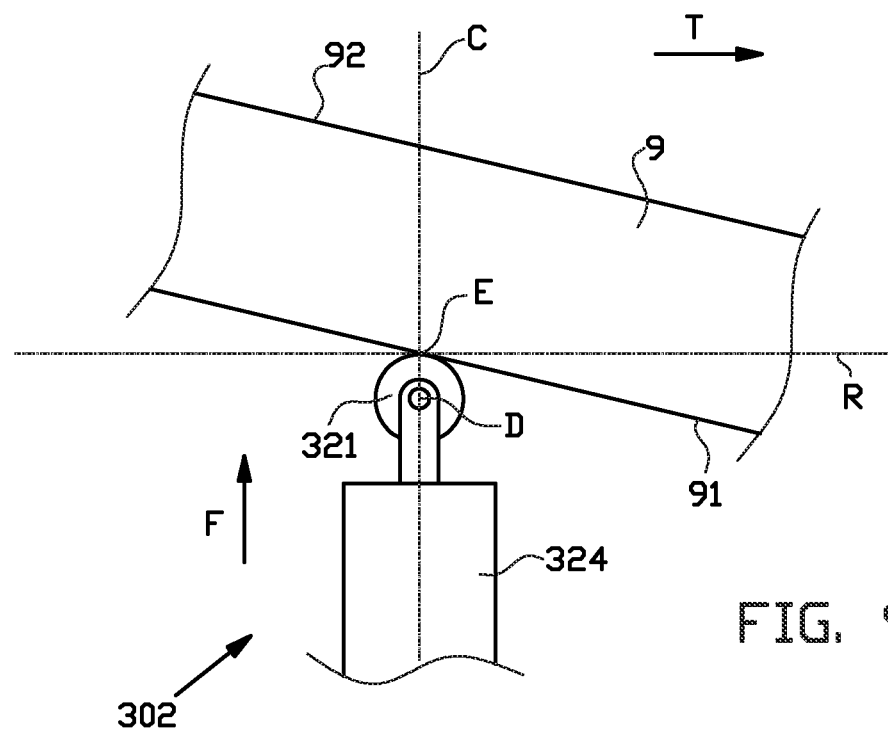

FIG. 9 shows a further alternative positioning device 302. Said positioning device 302 differs from the previously discussed positioning device 202 in that the positioning element 321 is arranged at the cutting line C. The positioning device 302 is arranged to push the strip 9 in the positioning direction F along the cutting line C. Consequently, the first lateral side 91 of the lateral strip 9 may be positioned exactly at the reference point E which marks the intersection between the cutting line C and the reference line R. Hence, the resulting leading end LE and trailing end TE can be positioned at exactly the same lateral position for each cut as well. Consequently, the resulting splice may be improved even further. The trade-off of this embodiment is that the positioning element 321 may impede the cutting of the knife 3. Hence, the positioning element 321 should be moved away from the reference line R before the cutting may be initiated. This may slow down the production process.

FIGS. 10-13 show alternative embodiments of the positioning device 402, 502, 602, 702 which are provided with brackets, parts, linkages or mechanisms to move the aforementioned pivot axis B closer to the reference line R and/or the intersection E between the reference line R and the cutting line C. The pivot axis B may for example intersect with the support plane P at a position that is occupied by the knife 3, the anvil 4 and/or the conveyor 5. In particular, said pivot axis B may be a defined by a physical hinge point to which a bracket or mechanism is connected in a position or at a level that does not interfere with the operation of the knife 3, the anvil 4 and/or the conveyor 5. Alternatively, the pivot axis B may be virtual, for example by providing a mechanism or actuators that can move the positioning elements about said virtual pivot axis B without requiring a physical connection to said pivot axis B.

Figure 4:
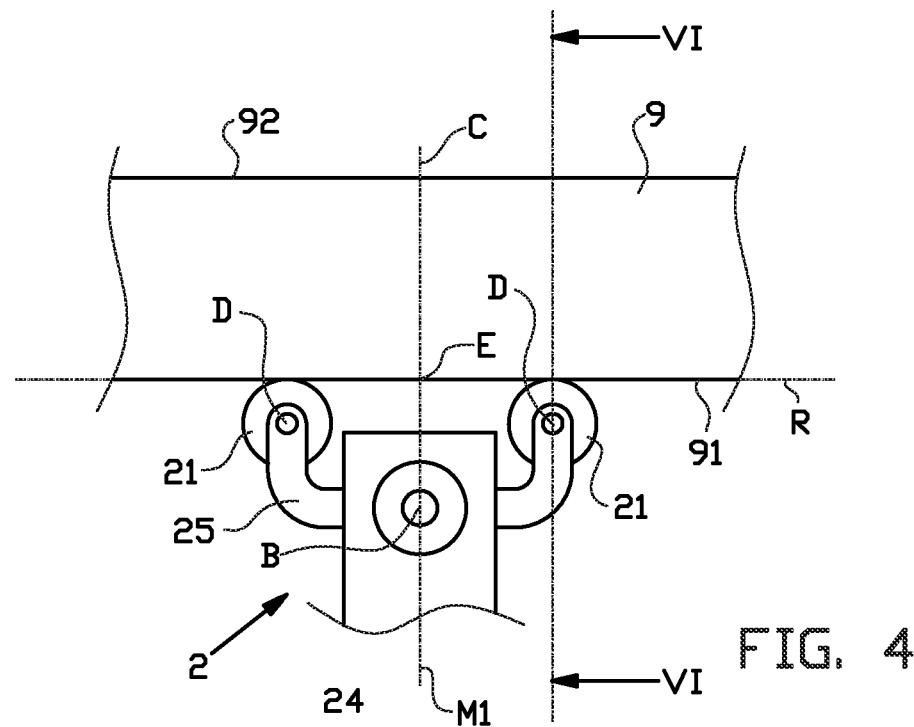
FIGS. 4 and 5 show detailed top views of the positioning device according to FIG. 3.
Figure 10:
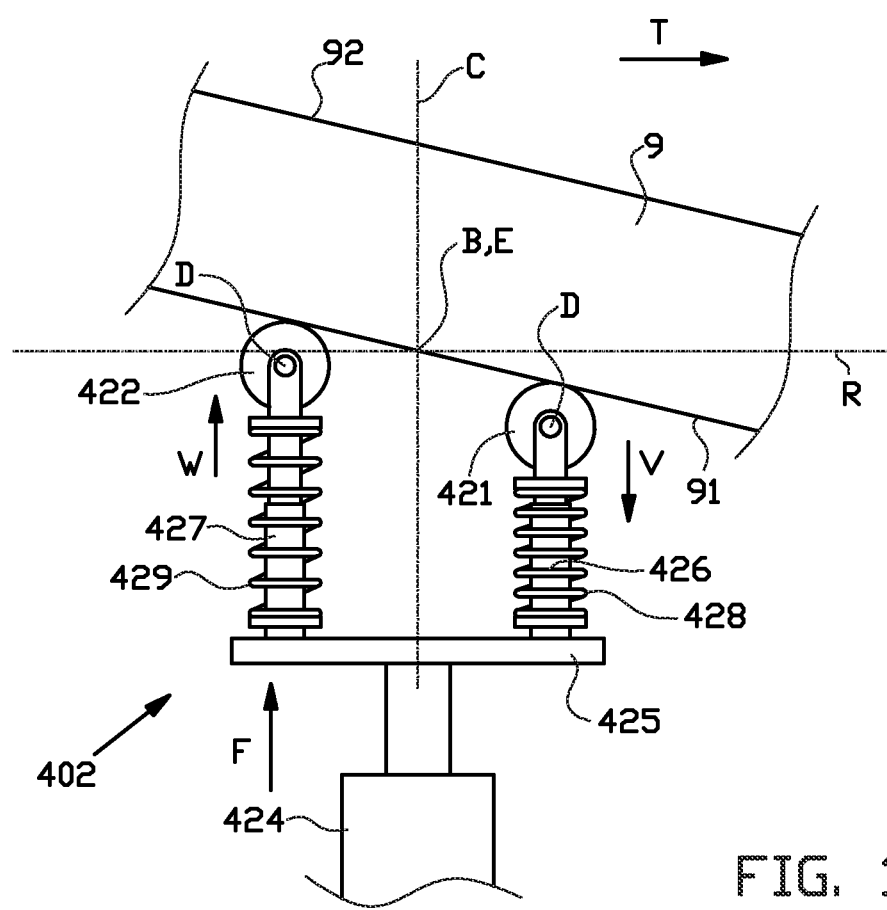

In particular, FIG. 10 shows a further alternative positioning device 402 that differs from the positioning device 2 as shown in FIG. 4 in that it the two positioning elements 421, 422 are supported by two resiliently compressible members 426, 427, such as telescopic arms. In this case, the resiliently compressible members 426, 427 are biased by springs 428, 429 to extent in the positioning direction F. Both resiliently compressible members 426, 427 are pushed by a bracket 425, driven by a drive member 424, in the positioning direction F, but both positioning elements 421, 422 can be independently forced against the strip 9 or pushed back by the strip 9 as a result of or against the bias of the springs 428, 429 in the respective displacement directions V, W, thus obtaining a virtual pivoting of the positioning elements 421, 422 about a virtual pivot axis B that can be located as close as possible to the reference line R and/or the intersection E between the reference line R and the cutting line C.

Figure 11:
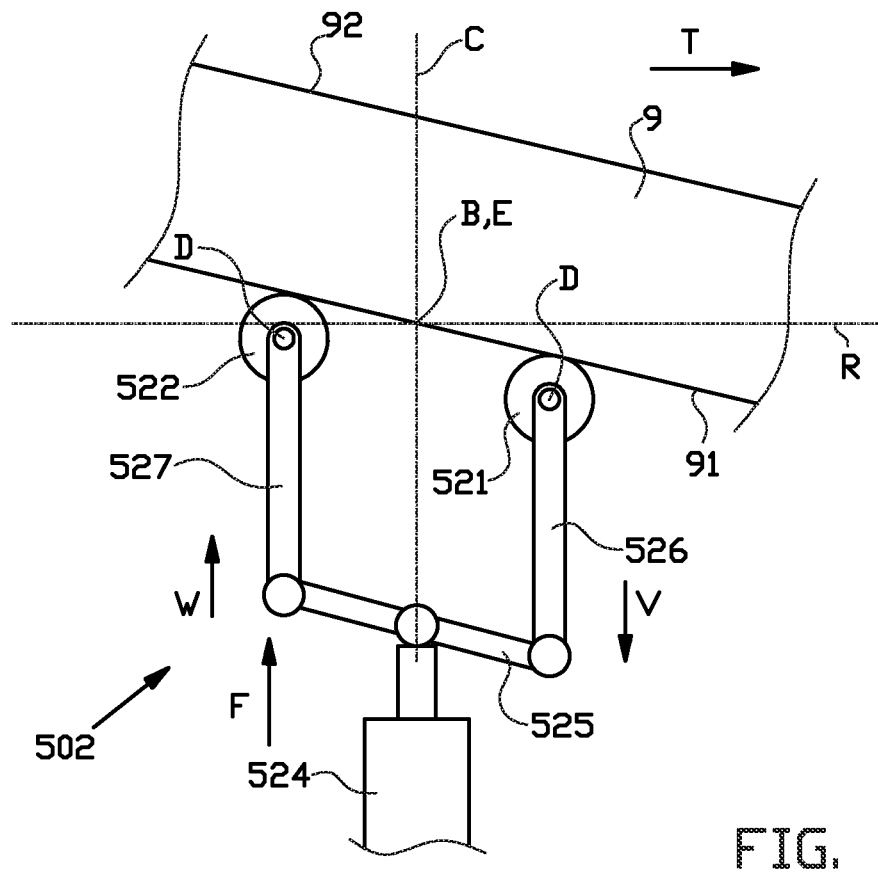

Similarly, FIG. 11 shows a further alternative positioning device 502 that has a bracket 525 that is pushed towards the strip 9 by a drive member 524 and that is formed out of multiple rods or linkages 526, 527. Hence, a linkage mechanism can be formed with a virtual pivot axis B between the respective positioning elements 521, 522 in a similar position as mentioned in the previous embodiment.

Figure 12:
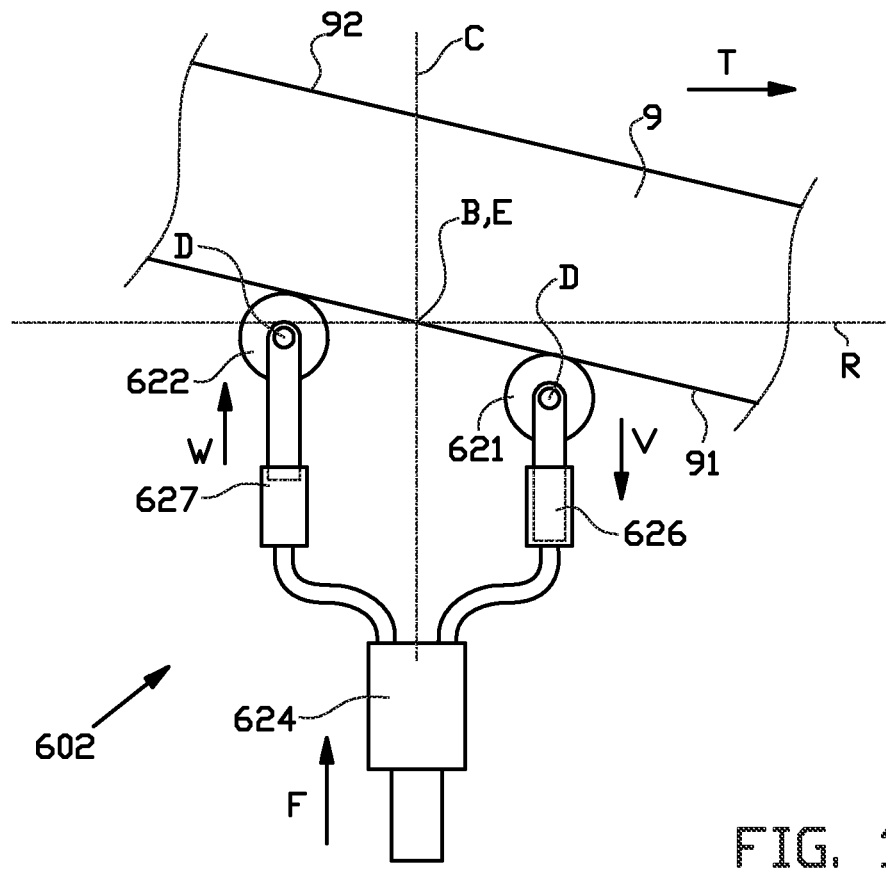

FIG. 12 shows a further alternative positioning device 602 with two cylinders 626, 627 which that can be individually controlled to move independently, like the resiliently compressible members 426, 427 in FIG. 10, to obtain the aforementioned position of the virtual pivot axis B between the respective positioning elements 621, 622. The cylinders 626, 627 can be connected to a common drive member 625, for example a shared source of compressed air, or may have different sources.

Figure 13:
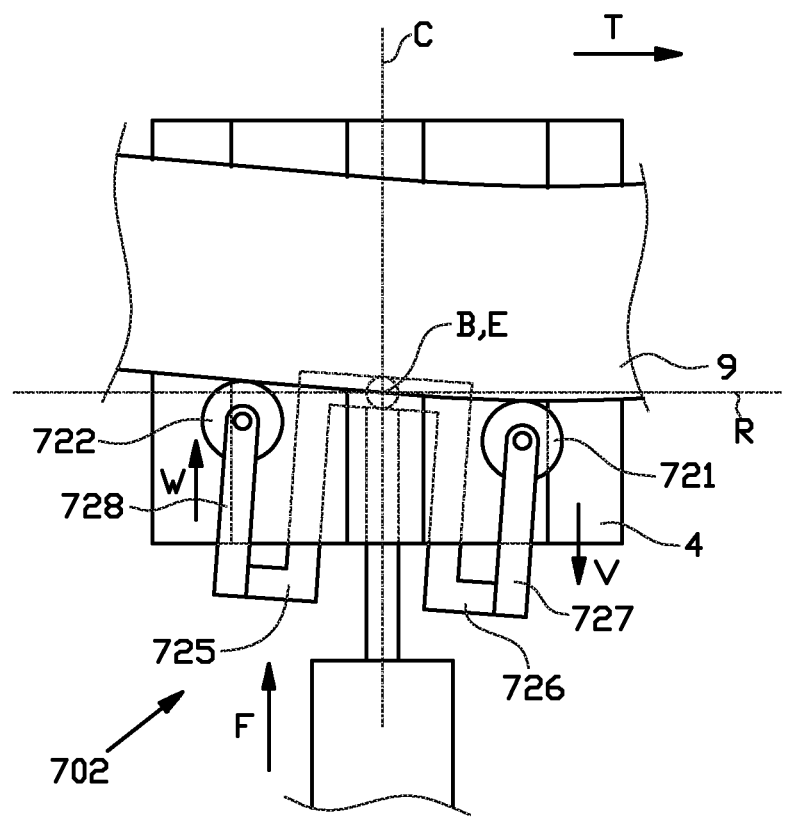

FIG. 13 finally shows a further alternative positioning device 702 that differs from the aforementioned positioning device 2 in that is provided with a bracket having one or more first bracket members 725, 726 extending above or below the support plane P up to a physical hinge point at the pivot axis B and two or more second bracket members 727, 728 holding or supporting the respective positioning elements 721, 722 relative to said pivot axis B at or in the support plane P.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS 100 production line
1 cutting device
2 positioning device
20 base
21 positioning element
22 positioning element
23 positioning drive
24 drive member
25 bracket
3 knife
4 anvil 40 recess
41 cutting surface
44 clamp
5 conveyor
51 conveyor roll
61 leading end gripper
62 trailing end gripper
8 building drum
9 strip
91 first lateral side
92 second lateral side
95 dog ear
102 alternative positioning device
121 first positioning element
122 second positioning element
124 drive member
125 bracket
202 alternative positioning device
221 positioning element
302 alternative positioning device
321 positioning element
402 alternative positioning device
421 first positioning element
422 second positioning element
424 drive member
425 bracket
426 first resiliently compressible member
427 second resiliently compressible member
428 first spring
429 second spring
502 alternative positioning device
521 first positioning element
522 second positioning element
524 drive member
525 bracket
526 first linkage
527 second linkage
602 alternative positioning device
621 first positioning element
622 second positioning element
624 drive member
626 first cylinder
627 second cylinder
702 alternative positioning device
721 first positioning element
722 second positioning element
725, 726 first bracket members
727, 728 second bracket members
LE leading end
TE trailing end
TE' trailing end projection
A drum axis
B pivot axis
C cutting line
D roller axis
E reference point
F positioning direction
K cutting direction
L lateral direction
M middle line
P support plane
R reference line
T transport direction
V first displacement direction
W second displacement direction

The invention claimed is:

1. A cutting device for cutting a continuous length of an apex strip for tire building, wherein the cutting device comprises a conveyor for conveying the apex strip in a transport direction in a support plane and a knife for cutting through the apex strip along a cutting line transverse to the transport direction, wherein the cutting device further comprises a positioning device for pushing the apex strip in a positioning direction transverse or perpendicular to the transport direction towards a longitudinal reference line at the cutting line.

2. The cutting device according to claim 1, wherein the positioning device comprises one or more positioning elements which are movable relative to the conveyor in the positioning direction for pushing a first lateral side of the apex strip towards the longitudinal reference line.

3. The cutting device, according to claim 2, wherein the positioning device is arranged to push one of the one or more positioning elements against the apex strip at the cutting line.

4. The cutting device according to claim 2, wherein the positioning device is arranged to push one of the one or more positioning elements against the apex strip downstream of the cutting line in the transport direction.

5. The cutting device according to claim 2, wherein the positioning device is arranged to push one of the one or more positioning elements against the apex strip upstream of the cutting line in the transport direction.

6. The cutting device according to claim 2, wherein the positioning device comprises two or more positioning elements, wherein the positioning device is arranged to push a first positioning element of the one or more positioning elements against the apex strip downstream of the cutting line in the transport direction, and wherein the positioning device is arranged to push a second positioning element of the one or more positioning elements against the apex strip upstream of the cutting line in the transport direction.

7. The cutting device according to claim 6, wherein the positioning device further comprises a drive member for pushing the first positioning element and the second positioning element in the positioning direction into contact with the apex strip, wherein the first positioning element and the second positioning element are arranged to move in a first displacement direction and a second displacement direction opposite to the first displacement direction relative to the drive member.

8. The cutting device according to claim 7, wherein the movement of the first positioning element in the first displacement direction has a fixed relationship or a 1:1 relationship or in a directly proportional relationship to the distance of said positioning elements to the cutting line or a middle line between the positioning.

9. The cutting device according to claim 6, wherein the first positioning element and the second positioning element are pivotable about a common pivot axis extending or perpendicular to the support plane.

10. The cutting device according to claim 8, wherein the first positioning element and the second positioning element are arranged at a fixed mutual angle about the pivot axis.

11. The cutting device according to claim 8, wherein the positioning device comprises a bracket which is rotatable about the pivot axis and which supports the first positioning element and the second positioning element.

12. The cutting device according to claim 11, wherein the first positioning element and the second positioning element are in a fixed position relative to said bracket.

13. The cutting device according to claim 11, wherein the bracket comprises one or more first bracket members extending above or below the support plane up to the pivot axis and one or more second bracket members extending in the support plane to carry the first positioning element and the second positioning element, wherein the pivot axis is located at an intersection between the cutting line and the longitudinal reference line.

14. The cutting device according to claim 9, wherein the pivot axis is a virtual pivot axis.

15. The cutting device according claim 9 wherein the first positioning element and the second positioning element are arranged symmetrical with respect to a middle line intersecting with and extending radially with respect to the pivot axis.

16. The cutting device according to claim 9, wherein the pivot axis intersects with the cutting line.

17. The cutting device according to claim 1, wherein the one or more positioning elements are rollers which are each rotatable about a roller axis perpendicular to the support plane.

18. The cutting device according to claim 1, wherein the positioning device comprises a positioning drive for pushing the one or more positioning elements in the positioning direction.

19. The cutting device according to claim 18, wherein the positioning drive is a linear drive.

20. The cutting device according to claim 18, wherein the positioning drive has a fixed stroke.

21. The cutting device according to claim 18, wherein the positioning drive is a pneumatic drive.

22. The cutting device according to claim 1, wherein the cutting device comprises an anvil for cooperating with the knife, wherein the anvil is located below the support plane.

23. The cutting device according to claim 22, wherein the anvil comprises one or more recesses for accommodating the one or more positioning elements, at least when said one or more positioning elements are being displaced in the positioning direction towards the longitudinal reference line.

24. The cutting device according to claim 22, wherein the cutting device further comprises clamping elements for clamping the apex strip upstream and downstream of the cutting line in the transport direction.

25. A production line for applying an apex strip to a bead, wherein the production line comprises the cutting device according to claim 1 and a drum for holding the bead, wherein the production line further comprises grippers for gripping the leading a leading end and a trailing end of a cut to length apex strip at the cutting device and for depositing said leading end and said trailing end at the drum.

26. A method for cutting an apex strip, wherein the method comprises the steps of:
   a) transporting the apex strip in a transport direction in a support plane;
   b) cutting the apex strip along a cutting line transverse or perpendicular to the transport direction; and
   c) before step b), pushing a first lateral side of the apex strip in a positioning direction transverse or perpendicular to the transport direction up to a longitudinal reference line.

27. The method according to claim 26, wherein the apex strip is clamped during step b).

28. The method according to claim 26, wherein step c) comprises pushing the first lateral side of the apex strip at two distinct points, wherein a first one of the distinct points is located downstream of the cutting line in the transport direction, and wherein a second one of the distinct points is located upstream of the cutting line in the transport direction.

29. The method according to claim 26, for cutting a continuous length of an apex strip for tire building, wherein the method uses a cutting device which comprises a conveyor for conveying the apex strip in a transport direction in a support plane and a knife for cutting through the apex strip along a cutting line transverse to the transport direction, wherein the cutting device further comprises a positioning device for pushing the apex strip in a positioning direction transverse or perpendicular to the transport direction towards a longitudinal reference line at the cutting line.

* * * * *